Patented Feb. 24, 1948

2,436,779

UNITED STATES PATENT OFFICE 2,436,779

TRIAMINO PROPANES

Murray Senkus, Terre Haute, Ind., assignor to Commercial Solvents Corporation, Terre Haute, Ind., a corporation of Maryland No Drawing. Application December 8, 1944, Serial No. 567,325

3 Claims. (Cl. 260—583)

This invention relates to a new class of triamines and to a method for preparing them. More particularly it relates to triamines having the following general formula:

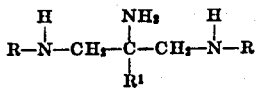

wherein R represents an alkyl group and $R^1$ represents alkyl or phenyl.

Illustrative of compounds included in the above general formula are 2-amino-2-methyl-1,3-propanebis(isopropylamine); 2-amino-2-ethyl-1,3-propanebis(isopropylamine); 2-amino-2-propyl-1,3-propanebis(butylamine); 2-amino-2-phenyl-1,3-propanebis(pentylamine); 2-amino-2-hexyl-1,3-propanebis(ethylamine); 2-amino-2-octyl-1,3-propanebis(octadecylamine); 2-amino-2-pentyl-1,3-propanebis(decylamine) and the like.

In preparing the triamines of my invention, I utilize the corresponding nitro diamine, that is, a nitro amine wherein the nitro group is attached to the center carbon atom, and catalytically hydrogenate this group to the amino group. According to my invention, either the pure nitro amine or a crude product which has not been purified by rectification is dissolved in a solvent inert to the nitro amine, such as methanol, ethanol and the like, and hydrogenated at temperatures below about 125° C. preferably at temperatures of about 30 to 100° C., and pressures above atmospheric and preferably of about 500 lb. per square inch in the presence of a hydrogenation catalyst such as Raney nickel catalyst, palladium charcoal, platinum charcoal and the like. After hydrogenation the solution is then filtered to remove the catalyst and distilled to remove the inert solvent. The triamine product may then be recovered by any desired means, for example, by refluxing with a solvent capable of removing water such as benzene, utilizing means such as a moisture trap connected to the condenser to remove the water. The pure product may then be recovered by rectification or by crystallization.

The nitro amines used as the starting materials in carrying out my invention may be prepared by any desired means, for example, by the method described in my patent, Serial No. 2,381,408. By this procedure a primary aliphatic amine is reacted with formaldehyde to form the corresponding N-(hydroxymethyl)alkylamine, which is in turn reacted with an equimolecular quantity of a primary nitro-paraffin to produce the desired nitro amine.

The new compounds of my invention are uniquely suited for utilization in the preparation of substituted 1,3,7-triaza [3·3·0]bicyclooctanes by reaction with aldehydes as described in my patent, Serial No. 2,393,826. This is a most unusual and unexpected type of reaction and is apparently dependent upon the presence of amino groups on three adjacent carbon atoms, and particularly to the presence of two reactive hydrogen on the central amino group, and at least one reactive hydrogen on each of the other two amino groups.

The following specific examples will further illustrate my invention:

Example I

One hundred parts of crude 2-nitro-2-methyl-1,3-propanebis(isopropylamine) was dissolved in 100 parts of methanol and the solution placed in a pressure vessel together with 5 parts of Raney nickel catalyst. The vessel was closed and hydrogen passed through at a pressure of about 500 lb. per square inch and at a temperature between 30 and 50° C. After hydrogenation was complete the solution was filtered to remove the catalyst, and distilled to remove methanol. Then 200 parts of benzene were added to the residue. A moisture trap connected to a condenser was fitted to the top of the column and the mixture was refluxed, with return of benzene to the flask, until water had ceased separating in the trap. Distillation of the residue was then resumed. The crude product was purified by rectification and 2-amino-2-methyl-1,3-propanebis(isopropylamine) was recovered in 65% conversion. It was a colorless liquid and had a boiling point of 98–100° C. at 3 mm. pressure, $n_d^{20}$ 1.4502, $d_{20}^{20}$ 0.8596. Nitrogen found 22.35%, theory 22.45%.

Example II

A mixture of 100 parts of crude 2-nitro-2-ethyl-1,3-propanebis(isopropylamine), 100 parts of methanol and 5 parts Raney nickel catalyst were subjected to hydrogenation under the conditions described in Example I, and recovered as there described. A conversion of 80% 2-amino-2-ethyl-1,3-propanebis(isopropylamine) was obtained. This compound was a colorless liquid having a boiling point of 71–72° C. at 1 mm. pressure, $n_d^{20}$ 1.4491, $d_{20}^{20}$ 0.8520; nitrogen found 20.87%, theory 20.87%.

While the above describes the preferred embodiments of my invention, it will be understood that departures may be made therefrom

What is claimed is:
1. As new compositions of matter triamines having the following general formula:

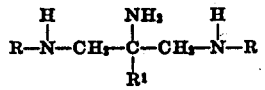

wherein R represents alkyl groups, and R¹ represents a member selected from the group consisting of alkyl and phenyl.
2. 2-amino-2-methyl-1,3-propanebis(isopropylamine).
3. 2-amino-2-ethyl-1,3-propanebis(isopropylamine).

MURRAY SENKUS.

REFERENCES CITED

The following references are of record in the file of this patent:

UNITED STATES PATENTS

| Number | Name | Date |
|---|---|---|
| 2,237,660 | Ellis | Apr. 8, 1941 |

OTHER REFERENCES

Beilstein, "Handbuch der Org. Chemie," 4th ed., vol. IV, page 274.

Cerf de Mauny, "Bul. Soc. Chim. de France" (1937), pages 1451–1457.